US012131847B2

(12) United States Patent
Ooshima et al.

(10) Patent No.: US 12,131,847 B2
(45) Date of Patent: Oct. 29, 2024

(54) MULTICORE CABLE

(71) Applicant: SUMITOMO ELECTRIC INDUSTRIES, LTD., Osaka (JP)

(72) Inventors: Takumi Ooshima, Tochigi (JP); Masayuki Ishikawa, Tochigi (JP); Jo Yagisawa, Tochigi (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 258 days.

(21) Appl. No.: 17/756,435

(22) PCT Filed: Dec. 6, 2019

(86) PCT No.: PCT/JP2019/047948
§ 371 (c)(1),
(2) Date: May 25, 2022

(87) PCT Pub. No.: WO2021/111634
PCT Pub. Date: Jun. 10, 2021

(65) Prior Publication Data
US 2022/0415539 A1 Dec. 29, 2022

(51) Int. Cl.
*H01B 9/00* (2006.01)
*H01B 7/04* (2006.01)
*H01B 11/02* (2006.01)

(52) U.S. Cl.
CPC ............... *H01B 9/003* (2013.01); *H01B 7/04* (2013.01); *H01B 11/02* (2013.01)

(58) Field of Classification Search
None
See application file for complete search history.

(56) References Cited

U.S. PATENT DOCUMENTS

| | | | | | |
|---|---|---|---|---|---|
| 1,626,777 | A * | 5/1927 | Austin | H01B 5/004 | 174/128.1 |
| 1,691,869 | A * | 11/1928 | Fowle | H01B 5/08 | 174/128.1 |
| 4,673,775 | A * | 6/1987 | Nigol | H01B 5/104 | 174/128.1 |
| 5,082,995 | A * | 1/1992 | Paterson | H01B 7/282 | 174/110 S |

(Continued)

FOREIGN PATENT DOCUMENTS

| | | | |
|---|---|---|---|
| CN | 201556440 U * | 8/2010 | |
| CN | 203812608 U | 9/2014 | |

(Continued)

*Primary Examiner* — Krystal Robinson
(74) *Attorney, Agent, or Firm* — IPUSA, PLLC

(57) ABSTRACT

A multicore cable includes power lines, and an outer jacket covering the power lines. The power lines include one first conductor disposed at a center, and second conductors disposed on an outer periphery of the first conductor, that are twisted together. Each of the first and second conductors includes 10 or more and 100 or less twisted second element wires. A direction of lay of the first element wires of the first conductor, a direction of lay of the second element wires of the second conductor, and a direction of lay of the first conductor and the second conductors of the power line are the same. A length of lay of the first element wires and a length of lay of the second element wires are greater than or equal to 8 mm and less than or equal to 22 mm.

12 Claims, 4 Drawing Sheets

(56) References Cited

U.S. PATENT DOCUMENTS

| | | | | | |
|---|---|---|---|---|---|
| 5,493,071 | A * | 2/1996 | Newmoyer | H01B 7/295 174/34 |
| 5,659,152 | A * | 8/1997 | Horie | H01B 11/04 174/128.2 |
| 5,739,473 | A * | 4/1998 | Zerbs | H01B 11/02 174/121 A |
| 6,452,094 | B2 * | 9/2002 | Donner | H01B 11/02 174/27 |
| 2004/0112628 | A1 * | 6/2004 | Brandi | H01B 11/04 174/113 R |
| 2004/0222009 | A1 * | 11/2004 | Blew | H01B 3/441 174/110 F |
| 2005/0029006 | A1 * | 2/2005 | Takahashi | H01B 11/10 174/102 R |
| 2005/0092515 | A1 * | 5/2005 | Kenny | H01B 11/08 174/113 C |
| 2010/0051318 | A1 * | 3/2010 | Wang | H01B 11/12 174/113 R |
| 2017/0253198 | A1 * | 9/2017 | Hayakawa | B60R 16/0215 |
| 2018/0005723 | A1 | 1/2018 | Kohori et al. | |
| 2018/0061525 | A1 | 3/2018 | Kohori et al. | |
| 2018/0096750 | A1 * | 4/2018 | Masui | H01B 5/08 |
| 2018/0130571 | A1 | 5/2018 | Masui | |
| 2019/0172606 | A1 * | 6/2019 | Kohori | H01B 7/1875 |
| 2021/0057126 | A1 | 2/2021 | Kim et al. | |

FOREIGN PATENT DOCUMENTS

| | | | |
|---|---|---|---|
| CN | 206849519 | U | 1/2018 |
| JP | H08138455 | A * | 5/1996 |
| JP | 2009140661 | A * | 6/2009 |
| JP | 2016-212965 | | 12/2016 |
| JP | 2018-032515 | | 3/2018 |
| JP | 2018-060794 | | 4/2018 |
| JP | 2018-078007 | | 5/2018 |
| JP | 2019-102268 | | 6/2019 |
| JP | 2019-179594 | | 10/2019 |
| JP | 2019-185981 | | 10/2019 |

* cited by examiner

MULTICORE CABLE

TECHNICAL FIELD

The present disclosure relates to multicore cables.

BACKGROUND ART

Patent Document 1 discloses a multicore cable for vehicles, having two sheathed electric wires and an outer jacket covering the two sheathed wires.

PRIOR ART DOCUMENTS

Patent Document

Patent Document 1: Japanese Laid-Open Patent Publication No. 2018-32515

DISCLOSURE OF THE INVENTION

According to an aspect of the present disclosure, a multicore cable includes a plurality of power lines, and an outer jacket covering the plurality of power lines, the power lines include one first conductor disposed at a center, and a plurality of second conductors disposed on an outer periphery of the first conductor, that are twisted together, the first conductor includes 10 or more and 100 or less twisted first element wires, the second conductor includes 10 or more and 100 or less twisted second element wires, a direction of lay of the first element wires of the first conductor, a direction of lay of the second element wires of the second conductor, and a direction of lay of the first conductor and the second conductors of the power line are the same, and a length of lay of the first element wires and a length of lay of the second element wires are greater than or equal to 8 mm and less than or equal to 22 mm.

MODE OF CARRYING OUT THE INVENTION

Figure 1:
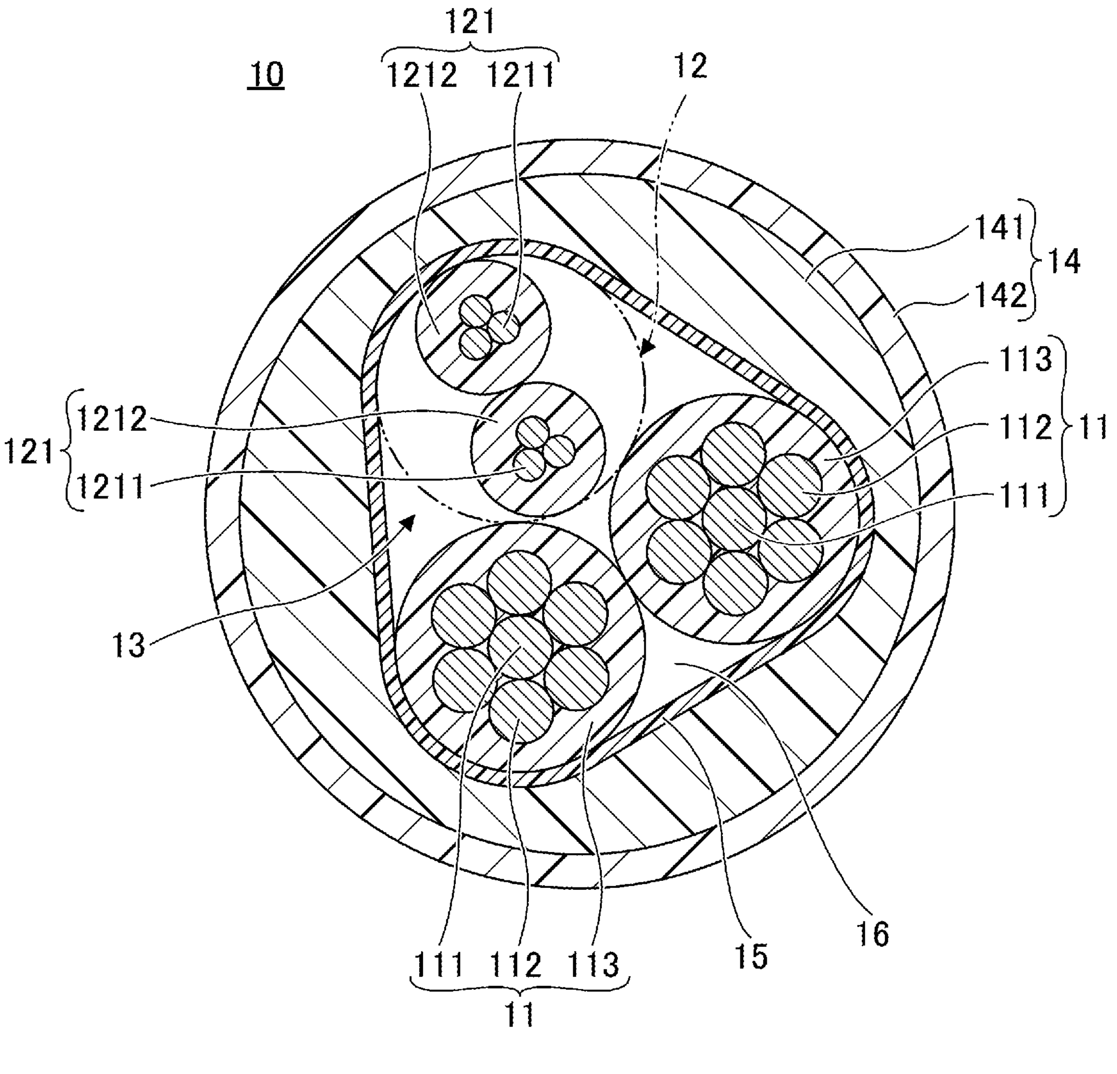
FIG. 1 is a cross sectional view perpendicular to a longitudinal direction of a multicore cable according to one aspect of the present disclosure.

Problems to be Solved by Present Disclosure

Because wheels are displaceably supported with respect to a body of a vehicle, and positions of the wheels are displaced with respect to the body of the vehicle when the vehicle is in use or the like, a multicore cable for connection between a controller mounted on the body, and electric parking brakes provided in a periphery of the wheels, or the like, may be bent repeatedly. For this reason, a high bending resistance is required from a viewpoint of increasing durability of the multicore cable.

One object of the present disclosure is to provide a multicore cable having an excellent bending resistance.

Effects of the Present Disclosure

According to the present disclosure, it is possible to provide a multicore cable having an excellent bending resistance.

Embodiments for carrying out the present disclosure will be described below.

Description of Embodiments of Present Disclosure

First, embodiments of the present disclosure will be described. In the following description, the same or corresponding elements are designated by the same reference numerals, and a repeated description of the same or corresponding elements will be omitted.

(1) A multicore cable according to one aspect of the present disclosure includes a plurality of power lines, and an outer jacket covering the plurality of power lines, the power lines include one first conductor disposed at a center, and a plurality of second conductors disposed on an outer periphery of the first conductor, that are twisted together, the first conductor includes 10 or more and 100 or less twisted first element wires, the second conductor includes 10 or more and 100 or less twisted second element wires, a direction of lay of the first element wires of the first conductor, a direction of lay of the second element wires of the second conductor, and a direction of lay of the first conductor and the second conductors of the power line are the same, and a length of lay of the first element wires and a length of lay of the second element wires are greater than or equal to 8 mm and less than or equal to 22 mm.

The multicore cable according to one aspect of the present disclosure can align a direction of the first element wire and a direction of the second element wire at a position where the first conductor and the second conductor make contact, by making the direction of lay of the first element wires of the first conductor the same as the direction of lay of the second element wires of the second conductor. For this reason, when the multicore cable including the power lines is bent, it is possible to reduce friction among the element wires included in the power lines, and further, to reduce damage to the element wires. Accordingly, even when the multicore cable is bent repeatedly, it is possible to reduce breaking of the first element wires and the second element wires, thereby increasing a bending resistance of the power lines.

By making the direction of lay of the first element wires of the first conductor the same as the direction of lay of the second element wires of the second conductor, it is unnecessary to switch the direction of lay when manufacturing the first conductor and the second conductor, thereby increasing productivity of the first conductor and the second conductor.

Moreover, by making the direction of lay of the first element wires of the first conductor, the direction of lay of the second element wires of the second conductor, and the direction of lay of the first conductor and the second conductors of the power line the same, it is possible to particularly reduce the friction among the element wires, thereby reducing damage to the element wires. For this reason, it is possible to particularly increase the bending resistance of the power lines.

The multicore cable according to one aspect of the present disclosure may include, in addition to the power lines, various sheathed electric wires, such as signal lines, electric wires, or the like, according to a device to which the multicore cable is to be connected, a voltage to be applied, or the like. However, among the sheathed electric wires included in the multicore cable, the power line is usually the thickest, and a large load is easily applied to the power line, thereby making it more likely for the power line to break when the multicore cable is bent repeatedly. For this reason, it is possible to increase the bending resistance of the entire multicore cable, by increasing the bending resistance of the power lines.

By making the length of lay of the first element wires and the length of lay of the second element wires greater than or equal to 8 mm, it is possible to increase the productivity of the first conductor and the second conductor. By making the length of lay of the first element wires and the length of lay of the second element wires less than or equal to 22 mm, it is possible to increase a packing density of the element wires per unit length in a longitudinal direction of the first conductor and the second conductor, thereby increasing strengths of the first conductor and the second conductor. For this reason, it is possible to further increase the bending resistance of the power lines and the multicore cable including the power lines, by making the length of lay of the first element wires and the length of lay of the second element wires less than or equal to 22 mm.

(2) The length of lay of the first element wires may be shorter than the length of lay of the second element wires.

Among the first conductor and the second conductors included in the power line, the first conductor that is disposed at the center may easily be pulled along the longitudinal direction. For this reason, it is possible to particularly increase the bending resistance of the power lines and the multicore cable including the power lines, by making the length of lay of the first element wires included in the first conductor shorter than that of the second element wires included in the second conductor, so as to sufficiently increase the strength of the first conductor.

(3) The length of lay of the first element wires and the length of lay of the second element wires may be greater than or equal to 10 mm and less than or equal to 14 mm.

By making the length of lay of the first element wires and the length of lay of the second element wires greater than or equal to 10 mm, it is possible to particularly increase the productivity of the first conductor and the second conductor. By making the length of lay of the first element wires and the length of lay of the second element wires less than or equal to 14 mm, it is possible to particularly increase the strength of the first conductor and the second conductor, and to particularly increase the bending resistance of the power lines and the multicore cable including the power lines.

(4) The length of lay of the second element wires may be greater than or equal to 1.1 times the length of lay of the first element wires and less than or equal to 1.4 times the length of lay of the first element wires.

It is preferable to increase the strength of the first conductor, because among the first conductor and the second conductors included in the power line, the first conductor that is disposed at the center may easily be pulled along the longitudinal direction. But because the second conductor is uneasily pulled in the longitudinal direction when compared to the first conductor, it is possible to increase the productivity of the second conductor without affecting the bending resistance of the power lines, by making the length of lay of the second element wires greater than or equal to 1.1 times the length of lay of the first element wires. It is possible to sufficiently increase the strength of the second conductor, and increase the bending resistance of the power lines and the multicore cable including the power lines, by making the length of lay of the second element wires less than or equal to 1.4 times the length of lay of the first element wires.

(5) The plurality of power lines may be twisted together, and a direction of lay of the plurality of power lines may be the same as the direction of lay of the first element wires of the first conductor, the direction of lay of the second element wires of the second conductor, and the direction of lay of the first conductor and the second conductors of the power line.

By making the direction of lay of the plurality of power lines the same as the direction of lay of the first element wires of the first conductor, the direction of lay of the second element wires of the second conductor, and the direction of lay of the first conductor and the second conductors in the power line, it is possible to smoothen movement in the longitudinal direction of the individual power lines included in the twisted power lines, when the multicore cable is bent. Accordingly, even when the multicore cable is bent repeatedly, it is possible to reduce a force from being applied locally on the power lines, thereby particularly increasing the bending resistance of the power lines and the multicore cable including the power lines.

(6) The multicore cable may further include a twisted signal line pair including two twisted signal lines having a smaller cross sectional area than the power line, the signal line may include a plurality of twisted third conductors, and a direction of lay of the third conductors of the signal line may be the same as a direction of lay of the signal lines of the twisted signal line pair.

By making the direction of lay of the third conductors of the signal line the same as and the direction of lay of the signal lines of the twisted signal line pair, it is possible to smoothen movement in the longitudinal direction of the individual signal lines included in the twisted signal line pair, when the multicore cable is bent. Accordingly, even when the multicore cable is bent repeatedly, it is possible to reduce a force from being applied locally on the signal lines, thereby particularly increasing the bending resistance of the signal lines and the multicore cable including the signal lines.

(7) The multicore cable may further include a twisted signal line pair including two twisted signal lines having a smaller cross sectional area than the power line, the signal line may include a plurality of twisted third conductors, a direction of lay of the third conductors of the signal line may be the same as a direction of lay of the signal lines of the twisted signal line pair, the twisted signal line pair and the plurality of power lines may be twisted together, and a direction of lay of the twisted signal line pair and the plurality of power lines may be the same as the direction of lay of the signal lines of the twisted signal line pair.

By making the direction of lay of the third conductors of the signal line the same as the direction of lay of the signal lines of the twisted signal line pair, it is possible to smoothen movement in the longitudinal direction of the individual signal lines included in the twisted signal line pair, when the multicore cable is bent. Accordingly, even when the multicore cable is bent repeatedly, it is possible to reduce a force from being applied locally on the signal lines, thereby particularly increasing the bending resistance of the signal lines and the multicore cable including the signal lines.

Moreover, by making the direction of lay of the twisted signal line pair and the plurality of power lines the same as the direction of lay of the signal lines of the twisted signal line pair, it is possible to smoothen movement in the longitudinal direction of the power lines and the twisted signal line pair, when the multicore cable is bent. Accordingly, even when the multicore cable is bent repeatedly, it is possible to reduce a force from being applied locally on the power lines and the signal lines, thereby particularly increasing the bending resistance of the power lines, the signal lines, and the multicore cable including the signal lines.

Details of Embodiments of the Present Disclosure

Specific examples of the multicore cable according to one embodiment of the present disclosure (hereinafter referred to as "the present embodiment") will be described below, with reference to the drawings. It should be understood that the present invention is not limited to these examples, and is intended to include what is defined by the appended claims and all modifications within the meaning and scope of the claims and equivalents thereof.

First, examples of a configuration of the multicore cable according to the present embodiment will be described, with reference to FIG. 1 through FIG. 3.

FIG. 1 illustrates a cross sectional view perpendicular to the longitudinal direction of a multicore cable 10 according to the present embodiment. FIG. 2 illustrates a cross sectional view perpendicular to the longitudinal direction of another example of the configuration of a multicore cable 20 according to the present embodiment, and FIG. 3 illustrates a cross sectional view perpendicular to the longitudinal direction of another example of the configuration of a multicore cable 30 according to the present embodiment, respectively.

Figure 2:
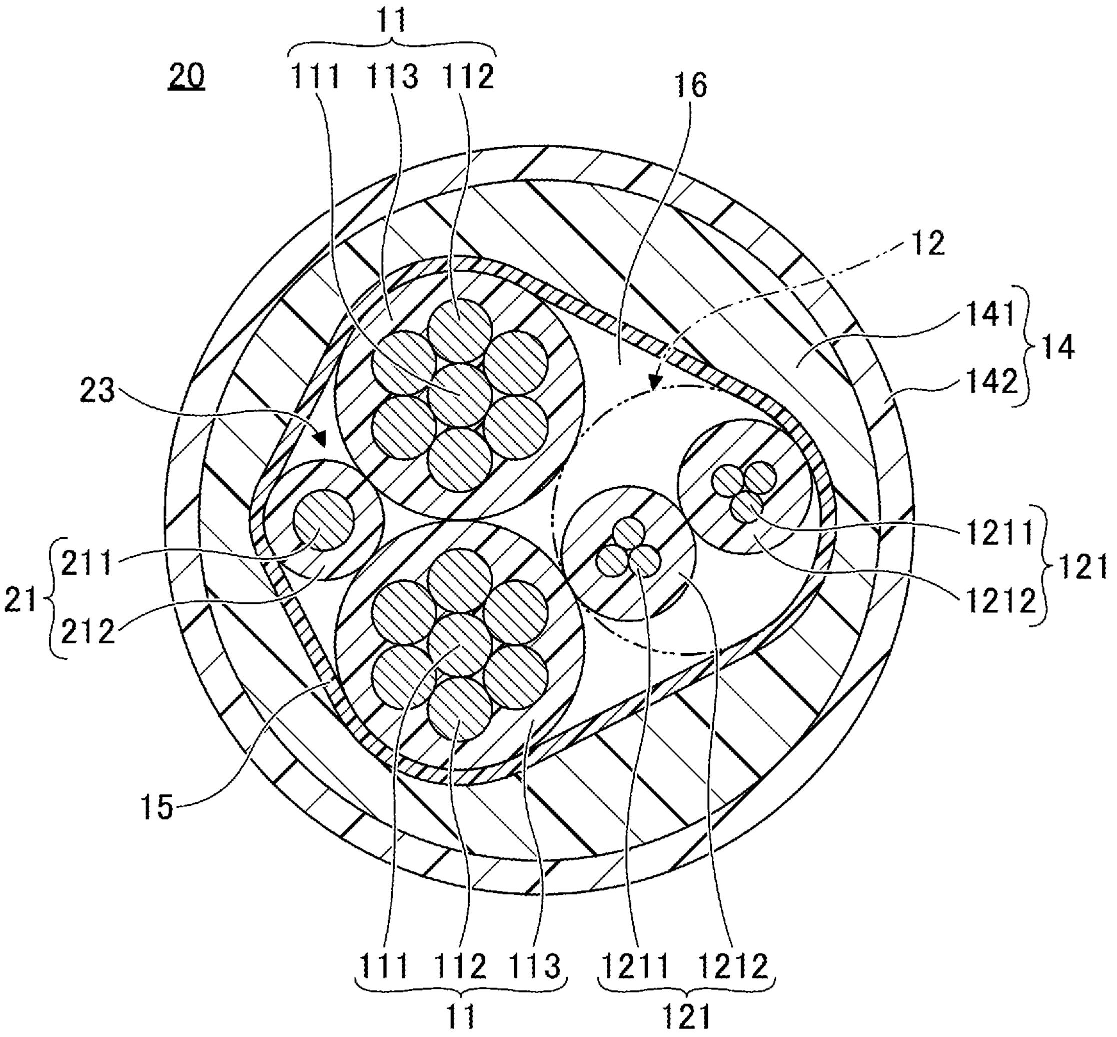
FIG. 2 is a cross sectional view perpendicular to the longitudinal direction of another example of a configuration of the multicore cable according to one aspect of the present disclosure.
Figure 3:
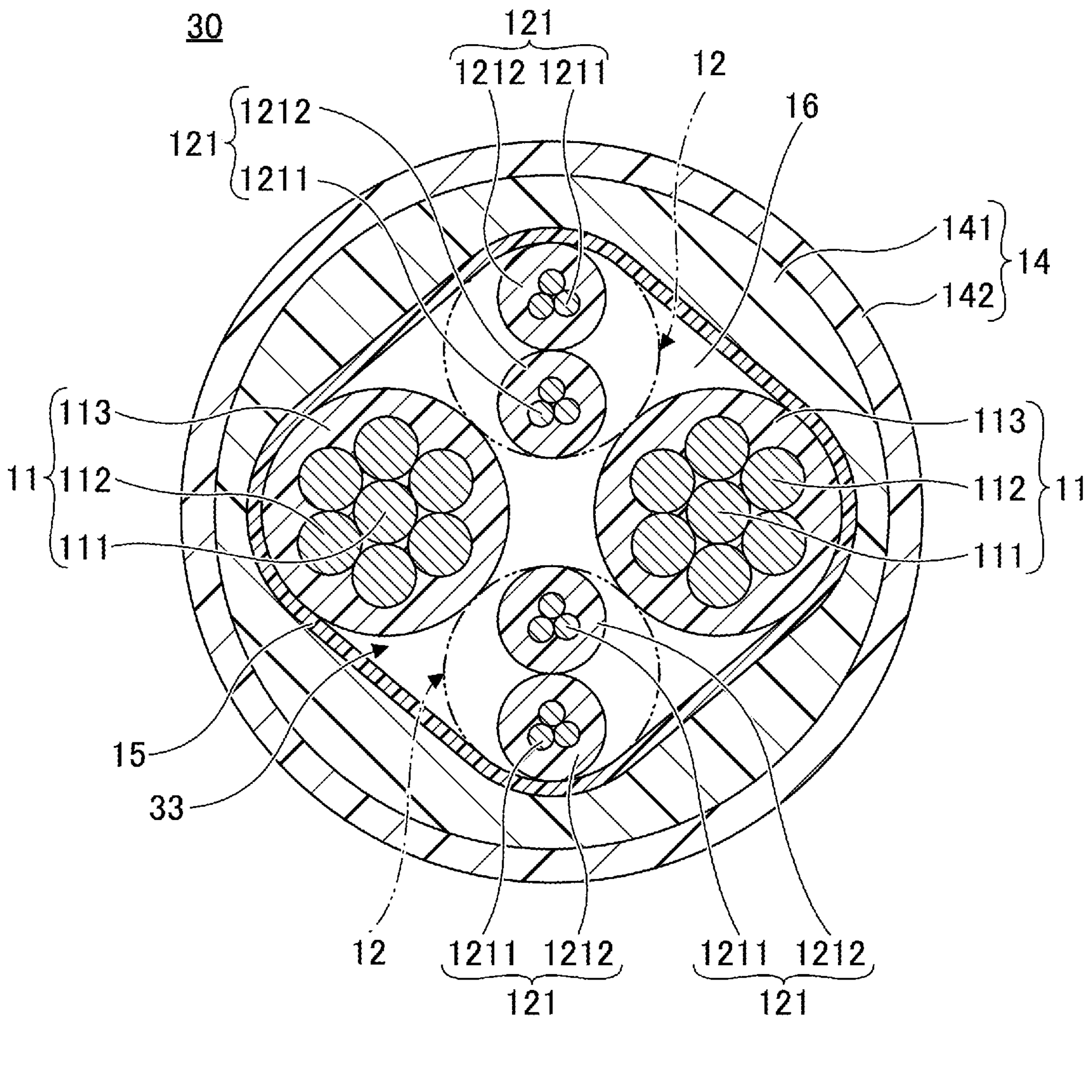
FIG. 3 is a cross sectional view perpendicular to the longitudinal direction of another example of the configuration of the multicore cable according to one aspect of the present disclosure.

As illustrated in FIG. 1 through FIG. 3, the multicore cables 10, 20, 30 according to the present embodiment may include a plurality of power lines 11, and an outer jacket 14 covering the plurality of power lines 11. Each of FIG. 1 through FIG. 3 illustrates an example in which two power lines 11 are provided, but the present embodiment is not limited to such configurations, and the multicore cable according to the present embodiment may be provided with three or more power lines 11.

The multicore cable according to the present embodiment may include, in addition to the power lines, various sheathed electric wires according to a device to which the multicore cable is to be connected, a voltage to be applied, or the like. A sheathed electric wire refers to an electric wire having a conductor and an insulating layer covering the conductor, examples of the sheathed electric wire includes a signal line and an electric wire. The multicore cable 10 illustrated in FIG. 1 includes, in addition to the two power lines 11, a twisted signal line pair 12 including two signal lines 121.

The multicore cable 20 illustrated in FIG. 2 includes, in addition to the two power lines 11, the twisted signal line pair 12 including the two signal lines 121, and one electric wire 21.

The multicore cable 30 illustrated in FIG. 3 includes, in addition to the two power lines 11, two twisted signal line pairs 12 including the two signal lines 121. Thus, the multicore cable may include an arbitrary number of sheathed electric wires having an arbitrary configuration, in addition to the plurality of power lines.

Members of the multicore cable according to the present embodiment will be described below.

(1-1) Power Line

Figure 4:
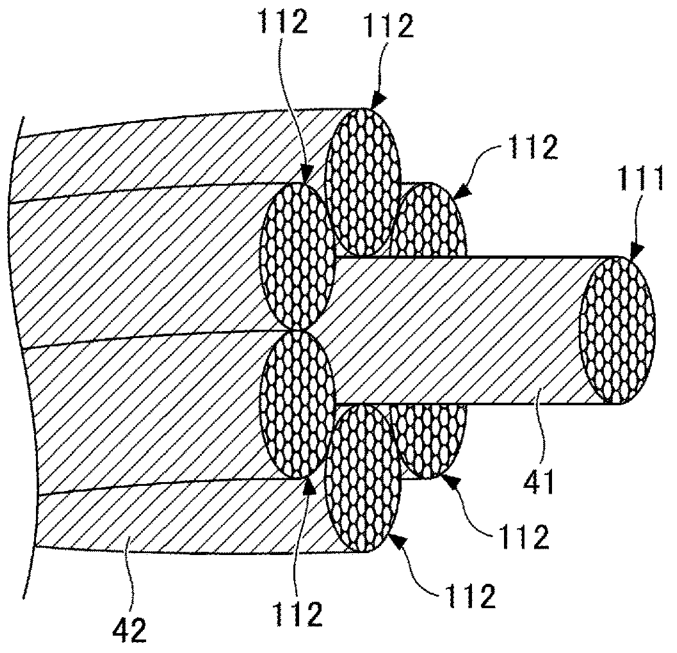
FIG. 4 is a side view of a conductor portion of a power line of the multicore cable according to one aspect of the present disclosure.

FIG. 4 illustrates a side view of a conductor portion of the power line 11. In FIG. 4, a length of the first conductor 111 and lengths of the second conductors 112 are varied and illustrated schematically, so that the first conductor 111 disposed at the center is visible. As illustrated in FIG. 4, the power line 11 includes a plurality of conductors, more particularly, the first conductor 111 disposed at the center, and the plurality of second conductors 112 disposed on the outer periphery of the first conductor 111, and the first conductor 111 and the second conductors 112 are twisted together.

In addition, each of the first conductor 111 and the second conductors 112 includes a plurality of element wires, that is, a plurality of filaments, that are twisted together. The first conductor 111 includes a plurality of first element wires 41 that are twisted together. The second conductor 112 includes a plurality of second element wires 42 that are twisted together.

The number of second conductors 112 included in the power line 11 may be selected according to a resistance value or the like required of the power line, and is not particularly limited, however, the number is preferably greater than or equal to 6 and less than or equal to 12, for example. By making the number of second conductors 112 greater than or equal to 6, it is possible to reduce irregularities of the outer periphery of the power line 11, and improve handling performance. In addition, by making the number of second conductors 112 less than or equal to 12, it is possible to increase the productivity of the power line 11.

Moreover, although element wire diameters of the first element wire 41 and the second element wire 42 are not particularly limited, the element wire diameters are preferably greater than or equal to 0.05 mm and less than or equal to 0.15 mm, and more preferably greater than or equal to 0.05 mm and less than or equal to 0.10 mm, for example. By making the element wire diameters of the first element wire 41 and the second element wire 42 greater than or equal to 0.05 mm, it is possible to maintain a breaking strength, and improve the handling performance of the first conductor 111 and the second conductor 112. Further, by making element wire diameters greater than or equal to 0.05 mm, it is possible to increase the productivity of the first conductor 111 and the second conductor 112, because the handling performance thereof can be improved. By making the element wire diameters of the first element wire 41 and the second element wire 42 less than or equal to 0.15 mm, it is possible to make the element wires uneasy to break, thereby particularly increasing the bending resistance of the power lines 11 and the multicore cable including the power lines 11.

The element wire diameter of the first element wire 41 may be the same as or may be different from the element wire diameter of the second element wire 42. However, the element wire diameter of the first element wire 41 is preferably the same as the element wire diameter of the second element wire 42, because it is possible in this case to reduce the types of element wires to be prepared, and increase the productivity of the element wire 41 and the element wire 42.

Although the number of element wires included in the first conductor 111 is not particularly limited, the number of element wires in the first conductor 111 is preferably greater than or equal to 10 and less than or equal to 100, and more preferably greater than or equal to 10 and less than or equal to 49, for example. In addition, although the number of element wires included in the second conductor 112 is not particularly limited, the number of element wires in the second conductor 112 is preferably greater than or equal to 10 and less than or equal to 100, and more preferably greater than or equal to 10 and less than or equal to 49, for example. The number of element wires included in the first conductor 111 may be the same as or may be different from the number of element wires included in the second conductor 112. The entire multicore cable can have 80 element wires or more and 1,300 element wires or less, for example.

By making the number of element wires included in the first conductor 111 and the second conductor 112 greater than or equal to 10, it is possible to sufficiently increase the strength of the first conductor 111 and the second conductor 112. In addition, by making the number of element wires included in the first conductor 111 and the second conductor 112 less than or equal to 100, it is possible to reduce outside diameters of the first conductor 111 and the second conductor 112. By reducing the outside diameters of the first conductor 111 and the second conductor 112, it is possible to reduce the outside diameter of the power line 11, and improve the handling performance. Outer diameters of the first conductor 111 and the second conductor 112 are not particularly limited, respectively, and may be greater than or equal to 0.4 mm and less than or equal to 1.0 mm, for example. Cross sectional areas of the first conductor 111 and the second conductor 112 are not particularly limited, respectively, and may be greater than or equal to 0.1 $mm^2$ and less than or equal to 0.5 $mm^2$, for example.

Materials of the first element wire 41 and the second element wire 42 are not particularly limited, and a wire made of copper or a copper alloy can be used for the first element wire 41 and the second element wire 42. The first element wire 41 and the second element wire 42 may be made of a material having predetermined electrical conductivity and flexibility, such as copper and copper alloys, as well as tin-plated annealed copper wires, annealed copper wires, or the like. The first element wire 41 and the second element wire 42 may be made of hard-drawn copper wires.

By making the direction of lay of the first element wires 41 in the first conductor 111 different from the direction of lay of the second element wires 42 in the second conductor 112, it is possible to reduce irregularities of the surface of the power line 11 and improve appearance when twisting the first conductor 111 and the second conductor 112 together. For this reason, conventionally, the direction of lay of the first element wires 41 in the first conductor 111 and the direction of lay of the second element wires 42 in the second conductor 112 are made different.

However, according to studies conducted by the present inventors of the present invention, it was found that the bending resistance of the multicore cable can be increased, by making the direction of lay of the first element wires 41 in the first conductor 111 the same as (to a direction identical to) the direction of lay of the second element wires 42 in the second conductor 112. From a viewpoint of particularly increasing the bending resistance of the multicore cable, the direction of lay of the first element wires 41 in the first conductor 111, the direction of lay of the second element wires 42 in the second conductor 112, and the direction of lay of the first conductor 111 and the second conductors 112 in the power line 11, are preferably the same.

By making the direction of lay of the first element wires 41 in the first conductor 111 the same as the direction of lay of the second element wires 42 in the second conductor 112, it is possible to align the direction of the first element wires 41 and the direction of the second element wires 42 at a position where the first conductor 111 and the second conductor 112 make contact. For this reason, when the multicore cable including the power lines is bent, it is possible to reduce friction among the element wires included in the power lines, and further, to reduce damage to the element wires. Accordingly, even when the multicore cable is bent repeatedly, it is possible to reduce breaking of the first element wires 41 and the second element wires 42, thereby increasing a bending resistance of the power lines 11.

By making the direction of lay of the first element wire 41 in the first conductor 111 the same as the direction of lay of the second element wire 42 in the second conductor 112, it is unnecessary to switch the direction of lay when manufacturing the first conductor 111 and the second conductor 112, thereby increasing productivity of the first conductor 111 and the second conductor 112.

Further, as described above, by making the direction of lay of the first element wires 41 in the first conductor 111, the direction of lay of the second element wires 42 in the second conductor 112, and the direction of lay of the first conductor 111 and the second conductor 112 in the power line 11 the same, it is possible to particularly reduce the friction among the element wires, thereby reducing damage to the element wires. For this reason, it is possible to particularly increase the bending resistance of the power lines 11.

As described above, the multicore cable according to the present embodiment may include, in addition to the power lines, various sheathed electric wires, such as signal lines, electric wires, or the like, according to the device to which the multicore cable is to be connected, the voltage to be applied, or the like. However, among the sheathed electric wires included in the multicore cable, the power line is usually the thickest, and a large load is easily applied to the power line, thereby making it more likely for the power line to break when the multicore cable is bent repeatedly. For this reason, it is possible to increase the bending resistance of the entire multicore cable, by increasing the bending resistance of the power lines as described above.

The length of lay of the first element wires 41 and the length of lay of the second element wires 42 are not particularly limited, but is preferably greater than or equal to 8 mm and less than or equal to 22 mm, and more preferably greater than or equal to 10 mm and less than or equal to 14 mm. Particularly, the length of lay of the first element wires 41 is preferably greater than or equal to 8 mm and less than or equal to 16 mm. The length of lay of the second element wires 42 is preferably greater than or equal to 8 mm and less than or equal to 18 mm.

By making the length of lay of the first element wires 41 and the length of lay of the second element wires 42 greater than or equal to 8 mm, it is possible to increase the productivity of the first conductor 111 and the second conductor 112. By making the length of lay of the first element wires 41 and the length of lay of the second element wires 42 greater than or equal to 10 mm, it is possible to particularly increase the productivity of the first conductor 111 and the second conductor 112.

By making the length of lay of the first element wires 41 and the length of lay of the second element wires 42 less than or equal to 22 mm, it is possible to increase a packing density of the element wires per unit length in the longitudinal direction of the first conductor 111 and the second conductor 112, thereby increasing strengths of the first conductor 111 and the second conductor 112. For this reason, it is possible to further increase the bending resistance of the power lines 11 and the multicore cable including the power lines 11, by making the length of lay of the first element wires 41 and the length of lay of the second element wires 42 less than or equal to 22 mm. By making the length of lay of the first element wires 41 and the length of lay of the second element wires 42 less than or equal to 14 mm, it is possible to particularly increase the strength of the first conductor 111 and the second conductor 112, and particularly increase the bending resistance of the power lines 11 and the multicore cable including the power lines 11.

The length of lay of the first element wires 41 may be the same as or may be different from the length of lay of the second element wires 42. However, from a viewpoint of particularly increasing the bending resistance of the multicore cable, the length of lay of the first element wires is preferably shorter than the length of lay of the second element wires. Among the first conductor 111 and the second conductors 112 included in the power line 11, the first conductor 111 that is disposed at the center may easily be pulled along the longitudinal direction. For this reason, it is possible to particularly increase the bending resistance of the power lines 11, and the multicore cable including the power lines 11, by making the length of lay of the first element wires 41 included in the first conductor 111 shorter than that of the second element wires 42 included in the second conductor 112, so as to sufficiently increase the strength of the first conductor 111.

The length of lay of the second element wires 42 is preferably greater than or equal to 1.0 times and less than or equal to 2.2 times the length of lay of the first element wires 41, and more preferably greater than or equal to 1.1 times and less than or equal to 1.4 times the length of lay of the first element wires 41. A ratio of the length of lay of the second element wires 42 with respect to the length of lay of the first element wires 41 can be computed from "the length of lay of the second element wires"/"the length of lay of the first element wires".

Because the length of lay of the first conductor 111 and the length of lay of the second conductor 112 may be made the same, the length of lay of the second element wires 42 may be greater than or equal to 1.0 times the length of lay of the first element wires 41. As described above, among the first conductor 111 and the second conductors 112 included in the power line 11, the first conductor 111 disposed at the center may easily be pulled along the longitudinal direction, and thus, it is preferable to increase the strength of the first conductor 111. However, because the second conductor 112 is uneasily pulled in the longitudinal direction when compared to the first conductor 111, it is possible to increase the productivity of the second conductor without affecting the bending resistance of the power lines, by making the length of lay of the second element wires 42 greater than or equal to 1.1 times the length of lay of the first element wires 41.

It is possible to sufficiently increase the strength of the second conductor 112, by making the ratio of the length of lay of the second element wires 42 with respect to the first element wires 41 less than or equal to 2.2 times. Particularly, by making the length of lay of the second element wires 42 less than or equal to 1.4 times the length of lay of the first element wires 41, it is possible to sufficiently increase the strength of the second conductor 112, and particularly increase the bending resistance power lines 11, and the multicore cable including the power lines 11.

As illustrated in FIG. 1 or the like, the multicore cable according to the present embodiment can have the plurality of power lines 11 twisted together. When twisting a plurality of power lines 11, the direction of lay of the plurality of power lines 11 is preferably the same as the direction of lay of the first element wires 41 in the first conductor 111, the direction of lay of the second element wires 42 in the second conductor 112, and the direction of lay of the first conductor 111 and the second conductor 112 in the power line 11.

By making the direction of lay of the plurality of power lines 11 the same as the direction of lay of the first element wires 41 in the first conductor 111, the direction of lay of the second element wires 42 in the second conductor 112, and the direction of lay of the first conductor 111 and the second conductor 112 in the power line 11, it is possible to smoothen movement in the longitudinal direction of the individual power lines 11 included in the twisted power lines, when the multicore cable is bent. Accordingly, even when the multicore cable is bent repeatedly, it is possible to reduce a force from being applied locally on the power lines 11, thereby particularly increasing the bending resistance of the power lines 11 and the multicore cable including the power lines 11.

The power line 11 can be used to connect an electric parking brake (EPB) and an electronic control unit (ECU), for example. The EPB includes a motor that drives a brake caliper. For example, in a case where the multicore cable includes two power lines, one power line 11 may be used as an electric supply line for supplying power to the motor, and the other power line 11 may be used as a ground line of the motor.

The power line 11 can have the outer peripheries of the first conductor 111 and the second conductors 112 covered with a first insulating layer 113. The first insulating layer 113 may be formed of a composition having a synthetic resin as a main component thereof, and is laminated on the outer periphery of the first conductor 111 and the second conductor 112, so as to cover the first conductor 111 and the second conductors 112. An average thickness of the first insulating layer 113 is not particularly limited, and may be greater than or equal to 0.1 mm and less than or equal to 5 mm, for example. The "average thickness" refers to an average value of the thickness measured at 10 arbitrary points. Hereinafter, the definition of "average thickness" is similar for other members or the like described in the following.

The main component of the first insulating layer 113 is not particularly limited, as long as the main component has insulating properties, but from a viewpoint of improving the bending resistance at low temperatures, it is preferable to use a copolymer (hereinafter, also referred to as a main component resin) of ethylene and α-olefin having a carbonyl group. A lower limit of a content of α-olefin having the carbonyl group in the main component resin is preferably 14 wt %, and more preferably 15 wt %. On the other hand, an upper limit of the content of α-olefin having the carbonyl group is preferably 46 wt %, and more preferably 30 wt %. The content of α-olefin having the carbonyl group is preferably greater than or equal to the lower limit described above, because it is possible to particularly increase the bending resistance at the low temperatures. In addition, the content of α-olefin having the carbonyl group is preferably less than or equal to the upper limit described above, because it is possible to improve mechanical characteristics, such as the strength of the first insulating layer 113, or the like.

The α-olefin having the carbonyl group preferably includes one or more elements selected from (meth) acrylate alkyl esters such as (meth) acrylate methyl, (meth) acrylate ethyl, or the like; (meth) acrylate aryl esters such as (meth) acrylate phenyl, or the like; vinyl esters such as vinyl acetate, vinyl propionate, or the like; unsaturated acids such as (meth) acrylic acid, crotonic acid, maleic acid, itaconic acid, or the like; vinyl ketones such as methyl vinyl ketone, phenyl vinyl ketone, or the like; (meth) acrylic amide, or the like. Among such elements, it is further preferable to select one or more elements from (meth) acrylate alkyl esters and vinyl esters, and select one or more elements from acrylate ethyls and vinyl acetates.

Examples of the main component resin include resins, such as ethylene-vinyl acetate copolymers (EVAs), ethylene-ethyl acrylate copolymers (EEAs), ethylene-methyl acrylate copolymers (EMAs), ethylene-butyl acrylate copolymers (EBAs), or the like, for example, and among such resins, it is preferable to select one or more elements from EVAs and EEAs.

The first insulating layer 113 may include additives, such as flame retardants, flame retarder assistants, antioxidants, lubricants, colorants, reflective pigments, masking agents, process stabilizers, plasticizers, or the like. In addition, the first insulating layer 113 may also include resins other than the main component resin described above.

An upper limit of the content of the other resins is preferably 50 wt %, more preferably 30 wt %, and even more preferably 10 wt %. Moreover, the first insulating layer 113 may be substantially free of the other resins.

Examples of the flame retardants include halogen-based flame retardants, such as bromine-based flame retardants, chlorine-based flame retardants, or the like, non-halogen-based flame retardants, such as metal hydroxides, nitrogen-based flame retardants, phosphorous-based flame retardants, or the like, or the like. One kind of flame retardant may be used by itself, or two or more kinds of flame retardants may be used in combination.

Examples of the bromine-based flame retardant include decabromodiphenylethane or the like, for example. Examples of the chlorine-based flame retardant include chlorinated paraffin, chlorinated polyethylene, chlorinated polyphenol, perchlorpentacyclodecane, or the like, for example. Examples of the metal hydroxides include magnesium hydroxide, aluminum hydroxide, or the like, for example. Examples of nitrogen-based flame retardant include melamine cyanurate, triazine, isocyanurate, urea, guanidine, or the like, for example. Examples of phosphorus-based flame retardant include metal salts of phosphinate, phosphafenanthrene, melamine phosphate, ammonium phosphate, phosphate esters, polyphosphazene, or the like, for example.

From a viewpoint of reducing environmental load, the flame retardant is preferably the non-halogen-based flame retardant, and more preferably the metal hydroxide, the nitrogen-based flame retardant, and phosphorus-based flame retardant.

In a case where the first insulating layer 113 includes the flame retardant, a lower limit of the flame retardant content in the first insulating layer 113 with respect to 100 parts by mass of the resin component, is preferably 10 parts by mass, and more preferably 50 parts by mass. On the other hand, an upper limit of the flame retardant content with respect to 100 parts by mass of the resin component, is preferably 200 parts by mass, and more preferably 130 parts by mass. If the flame retardant content is less than the lower limit described above, it may not be possible to exhibit a sufficient flame retardant effect. On the other hand, if the flame retardant content exceeds the upper limit described above, extrusion moldability of the first insulating layer 113 may deteriorate, and mechanical properties such as elongation, tensile strength, or the like may deteriorate.

The first insulating layer 113 preferably has the resin component crosslinked. Examples of the method of crosslinking the resin component of the first insulating layer 113 include a method of irradiating ionizing radiation, a method of using a thermal crosslinking agent, a method of using a silane graftmer, or the like, and the method of irradiating ionizing radiation is the preferable method. In addition, in order to promote the crosslinking, the composition forming the first insulating layer 113 is preferably added with a silane coupling agent.

As described above, the multicore cable according to the present embodiment can also include sheathed wires other than the power lines. For example, signal lines, electric wires, or the like may be included in the multicore cable. A configuration example of the signal line and the electric wire will be described.

(1-2) Signal Line

The signal line 121 includes third conductors 1211 that are thinner than the first conductor 111 and the second conductor 112, and a second insulating layer 1212 covering the third conductors 1211. The signal lines 121 can be twisted in pairs to form the twisted signal line pair 12. The two signal lines 121 twisted along the longitudinal direction can have the same size and use the same material. The length of lay of the twisted signal line pair 12 is not particularly limited, and may be greater than or equal to 4 times and less than or equal to 10 times a twisting diameter of the twisted signal line pair 12 (outside diameter of the twisted signal line pair 12), for example.

In a case where the multicore cable includes the twisted signal line pair 12 in addition to the power lines 11, the outside diameter of the twisted signal line pair 12 can be approximately the same as the outside diameter of the power line 11.

The signal line 121 can be used to transmit a signal from a sensor, or used to transmit a control signal from the ECU. The two signal lines 121 can be used for a wiring of an Anti-lock Brake System (ABS). Each of the two signal lines 121 can be used as a line connecting a differential wheel speed sensor and the ECU of a vehicle. The two signal lines 121 may be used to transmit other signals.

The third conductor 1211 may be formed by a single conductor, or may be formed by a plurality of conductors twisted together, similar to the power line 11. The third conductor 1211 may be made of the same material as the first conductor 111 and the second conductor 112 described above, or made of a different material. A cross sectional area of the third conductor 1211 is not particularly limited, and may be greater than or equal to 0.13 $mm^2$ and less than or equal to 0.5 $mm^2$, for example. The signal line 121 may include a plurality of third conductors 1211.

A material of the second insulating layer 1212 is not particularly limited, and may be formed of a flame retardant polyolefin-based resin, such as cross linked polyethylene or the like, for example, that is made flame retardant by blending thereto a flame retardant. The material forming the second insulating layer 1212 is not limited to the flame retardant polyolefin-based resin, and may be formed of other materials, such as a crosslinked fluorine-based resin or the like, for example. A outside diameter of the second insulating layer 1212 may be greater than or equal to 1.0 mm and less than or equal to 2.2 mm, for example.

In the case where the multicore cable according to the present embodiment includes the signal lines, the multicore cable according to the present embodiment may further include the twisted signal line pair 12, including the two signal lines 121 that are twisted together and have a smaller cross sectional area than the power line 11, as in the multicore cables 10 through 30 illustrated in FIG. 1 through FIG. 3.

In this case, the signal line 121 includes the plurality of third conductors 1211 that are twisted together as described above, and the direction of lay of the third conductors 1211 in the signal line 121 is preferably the same as the direction of lay of the signal lines 121 in the twisted signal line pair 12.

By making the direction of lay of the third conductors 1211 in the signal line 121 the same as the direction of lay of the signal lines 121 in the twisted signal line pair 12, it is possible to smoothen movement in the longitudinal direction of the individual signal lines 121 included in the twisted signal line pair 12, when the multicore cable is bent. Accordingly, even when the multicore cable is bent repeatedly, it is possible to reduce a force from being applied locally on the signal lines 121, thereby particularly increasing the bending resistance of the signal lines 121 and the multicore cable including the signal lines 121.

(1-3) Electric Wire

As illustrated in the multicore cable 20 of FIG. 2, the multicore cable according to the present embodiment may include the electric wire 21 as a sheathed wire.

The electric wire 21 includes a fourth conductor 211 thinner than the first conductor 111 and the second conductor 112, and a third insulating layer 212 covering the fourth conductor 211. The electric wire 21 may have the same size and use the same material as the signal line 121.

The electric wire 21 can be used to transmit the signal from the sensor, or used to transmit the control signal from the ECU, or used as the electric supply line for supplying power to an electronic device. The electric wire 21 can also be used as a ground wire.

The fourth conductor 211 may be formed by a single conductor, or may be formed by a plurality of conductors twisted together, similar to the power line 11. The fourth conductor 211 may be made of the same material as the first conductor 111, the second conductor 112, and the conductor forming the third conductor 1211, or may be made of a different material. A cross sectional area of the fourth conductor 211 is not particularly limited, and may be greater than or equal to 0.13 $mm^2$ and less than or equal to 0.5 $mm^2$, for example. The electric wire 21 may include a plurality of fourth conductors 211.

The third insulating layer 212 may be made of the same material as the second insulating layer 1212, or may be made of a different material. An outside diameter of the third insulating layer 212 may be greater than or equal to 1.0 mm and less than or equal to 2.2 mm, for example.

Two electric wires 21 may be used and twisted together to form a twisted electric wire pair. In this case, the two electric wires 21 that are twisted together preferably have the same size and use the same material. When the electric wires form the twisted electric wire pair and are disposed in the multicore cable together with the twisted signal wire pair, a direction of lay of the twisted electric wire pair is preferably the same as the direction of lay of the twisted signal line pair 12. Further, in this case, a length of lay of the twisted electric wire pair is preferably the same as the length of lay of the twisted signal line pair 12. An outside diameter of the twisted electric wire pair can be approximately the same as the outside diameter of the twisted signal line pair 12. The outside diameter of the twisted electric wire pair can be approximately the same as the outside diameter of the power line 11.

As described above, the configuration of the plurality of sheathed electric wires included in the multicore cable according to the present embodiment is not particularly limited, and an arbitrary number of sheathed electric wires having an arbitrary configuration may be included in the multicore cable according to the device or the like to which the multicore cable is to be connected. However, as in the multicore cables 10, 20, and 30 illustrated in FIG. 1 through FIG. 3, the multicore cable preferably includes the twisted signal line pair 12, in addition to the plurality of power lines 11. This is because a general-purpose multicore cable, that can be used in various applications, is obtainable by including the power lines 11 and the twisted signal line pair 12 in the multicore cable.

As described above, the plurality of power lines 11 can be twisted together. In addition, in a case where the multicore cable according to the present embodiment further includes a sheathed electric wire, such as a signal wire or the like, the plurality of power lines 11, and the sheathed electric wire or the like, can be twisted together, as required.

More particularly, in the case of the multicore cable 10 illustrated in FIG. 1, for example, the two power lines 11 and one twisted signal line pair 12 can be twisted together to form the core 13. In addition, in the case of the multicore cable 20 illustrated in FIG. 2, the two power lines 11, one twisted signal line pair 12, and the electric wire 21 can be twisted together to form the core 23. In the case of the multicore cable 30 illustrated in FIG. 3, the two power lines 11 and the two twisted signal line pairs 12 can be twisted together to form the core 33.

A twisting diameter of the core is not particularly limited, and may be greater than or equal to 5.5 mm and less than or equal to 9 mm, for example.

In addition, a length of lay of the core is not particularly limited, and may be greater than or equal to 12 times and less than or equal to 24 times the twisting diameter of the core, for example. By making the length of lay of the core less than or equal to 24 times the twisting diameter of the core, it is possible to reduce loosening of the twist, and particularly increase the bending resistance. Moreover, by making the length of lay of the core greater than or equal to 12 times the twisting diameter of the core, it is possible to particularly increase the productivity of the multicore cable.

In a case where the core includes the twisted signal line pair 12, a ratio of the length of lay of the core with respect to the twisting diameter of the core is preferably greater than a ratio of the length of lay of the twisted signal line pair 12 with respect to the twisting diameter of the twisted signal line pair 12. The direction of lay of the core is preferably the same as the direction of lay of the plurality of power lines 11. In addition, the direction of lay of the core is preferably also the same as the direction of lay of the twisted signal line pair 12.

In the case where the multicore cable according to the present embodiment further includes the twisted signal line pair 12 as illustrated in FIG. 1 or the like, the twisted signal line pair 12 and the plurality of power lines 11 can be twisted together as described above. In this case, the direction of lay of the twisted signal line pair 12 and the plurality of power lines 11 is preferably the same as the direction of lay of the signal lines 121 in the twisted signal line pair 12.

By making the direction of lay of the twisted signal line pair 12 and the plurality of power lines 11 the same as the direction of lay of the signal lines 121 in the twisted signal line pair 12, it is possible to smoothen movement in the longitudinal direction of the individual power lines 11 and the twisted signal line pair 12, when the multicore cable is bent. Accordingly, even when the multicore cable is bent repeatedly, it is possible to reduce a force from being applied locally on the power lines 11 and the signal lines 121, thereby particularly increasing the bending resistance of the power lines 11, the signal lines 121, and the multicore cable including the power lines 11 and the signal lines 121.

As described above, in the case where the multicore cable according to the present embodiment includes the twisted signal line pair 12, the twisted signal line pair 12 can be formed by twisting together the two signal lines 121 having a smaller cross sectional area than the power line 11, for example. Preferably, the signal line 121 includes the plurality of third conductors 1211 twisted together, and the direction of lay of the third conductors 1211 in the signal line 121 is the same as the direction of lay of the signal line 121 in the twisted signal line pair 12.

(2) Outer Jacket

As described heretofore, the multicore cable according to the present embodiment can include the plurality of power lines 11, sheathed electric wires, such as the signal lines 121, the electric wires 21, or the like, as required. The multicore cable according to the present embodiment can include the outer jacket 14 covering the plurality of power lines 11 all together. As described above, in the case where the multicore cable according to the present embodiment includes the sheathed power line, such as the signal line 121 or the like, in addition to the plurality of power lines 11, the outer jacket 14 can be disposed so as to cover the plurality of power lines 11 and the sheathed power lines all together.

The configuration of the outer jacket 14 is not particularly limited, and may be formed by a single layer, or may be formed by two or more layers.

More particularly, the outer jacket 14 can include a first sheath layer 141 and a second sheath layer 142 that are disposed in this order from the center of the multicore cable having the plurality of power lines 11 or the like disposed therein.

A main component of the first sheath layer 141 is not particularly limited, as long as the main component is a synthetic resin having flexibility, and the synthetic resin may be a polyolefin such as polyethylene, EVA, or the like, a polyurethane elastomer, a polyester elastomer, or the like, for example. Two or more kinds of such synthetic resins may be mixed and used.

A minimum thickness of the first sheath layer 141, that is, a minimum distance between the core and an outer periphery of the first sheath layer 141, is preferably greater than or equal to 0.3 mm, and more preferably greater than or equal to 0.4 mm. Further, the minimum thickness of the first sheath layer 141 is preferably less than or equal to 0.9 mm, and more preferably less than or equal to 0.8 mm.

An outside diameter of the first sheath layer 141 is preferably greater than or equal to 6.0 mm, and more preferably greater than or equal to 7.3 mm. Further, the outside diameter of the first sheath layer 141 is preferably less than or equal to 10 mm, and more preferably less than or equal to 9.3 mm.

Flame retardant properties are often desired of the second sheath layer 142 disposed on the outer side of the multicore cable. In addition, in a case of a cable mounted in the vehicle, such as an EPB cable or the like, the second sheath layer 142 is easily subjected to damage and wear due to stones skipping or the like encountered while the vehicle travels. Accordingly, excellent damage resistance and wear resistance are desired of a material forming the second sheath layer 142. In addition, a flexible material is desired in order to make the cable flexible.

A main component of the second sheath layer 142 is not particularly limited, as long as a synthetic resin has excellent flame retardant and wear resistance properties, and the synthetic resin may be polyurethane or the like, for example. The synthetic resin is particularly preferably a crosslinked thermoplastic polyurethane.

An average thickness of the second sheath layer 142 is preferably greater than or equal to 0.3 mm and less than or equal to 0.7 mm.

A flexibility of the first sheath layer 141 is preferably greater than a flexibility of the second sheath layer 142. This is because the second sheath layer 142 provides excellent flexibility of the multicore cable while ensuring the flame retardant and wear resistance properties. The resin component of each of the first sheath layer 141 and the second sheath layer 142 are preferably crosslinked. A method of crosslinking the first sheath layer 141 and the second sheath layer 142 can be similar to the method of crosslinking the first insulating layer 113.

In addition, the first sheath layer 141 and the second sheath layer 142 may include the example of the additive for the first insulating layer 113.

The multicore cable according to the present embodiment may further include an arbitrary member other than the plurality of power lines and the outer jacket described above.

For example, a left-hand lay 15, that covers the outer periphery of the plurality of power lines 11, may be provided. The left-hand lay 15 covers the core, that includes the plurality of electric wires and further includes sheathed electric wires in some cases, that are twisted together. By disposing the left-hand lay 15, it is possible to stably maintain the shape in which the plurality of power lines 11 or the like forming the core are twisted together. The left-hand lay 15 may be disposed on an inner side of the outer jacket 14.

A paper tape, a non-woven fabric, and a resin tape made of polyester or the like, for example, may be used as the left-hand lay 15. In addition, the left-hand lay 15 may be wound spirally along the longitudinal direction of the core, or have a configuration in which a longitudinal lapping, that is, a longitudinal direction of holding paper, is arranged along the longitudinal direction of the core. Moreover, the winding direction may be a Z-twist or a S-twist. In the case where the core 13 includes the twisted signal line pair 12 or the like, the winding direction of the left-hand lay 15 may be the same as the direction of lay of the twisted signal line pair 12 included in the core 13, or the left-hand lay 15 may be wound in the opposite direction. It is preferable for the winding direction of the left-hand lay 15 to be opposite to the direction of lay of the twisted signal line pair 12 or the like, because in this case, irregularities are uneasily generated at the surface of the left-hand lay 15, and an external shape of the multicore cable easily stabilizes.

Because the left-hand lay 15 has a cushioning function for increasing flexibility, and a protecting function for protection from the outside, a layer of the outer jacket 14 can be made thin when the left-hand lay 15 is provided. By providing the left-hand lay 15 in this manner, it is possible to provide a multicore cable that is more flexible and has excellent wear resistance.

In addition, when providing the outer jacket 14 or the like made of a resin by extrusion coating, the resin may fill in spaces between the plurality of sheathed electric wires, thereby making it difficult to separate the plurality of sheathed electric wires at a terminal end of the multicore cable. For this reason, by providing the left-hand lay 15, it is possible to prevent the resin from filling the spaces between the plurality of sheathed electric wires, and to facilitate extraction of the plurality of sheathed electric wires, such as the power lines, at the terminal end.

Moreover, the multicore cable according to the present embodiment may include an inclusion in a region 16 between the outer jacket 14 and the core, for example. The inclusion may be formed by fibers such as staple yarn, nylon yarn, or the like. The inclusion may be formed by high-tensile fibers.

The inclusion may be disposed in gaps formed between the sheathed electric wires, such as between the plurality of power lines 11, and between the power lines 11 and the signal lines 121.

Although the embodiment is described in detail above, various variations and modifications are possible within the scope of the appended claims, and the disclosure is not limited to a specific embodiment.

Exemplary Implementations

Although specific exemplary implementations will be described below, the present invention is not limited to these exemplary implementations.

Evaluation Method

First, a method for evaluating the multicore cable manufactured in the following experiment examples will be described.

(1) Evaluation of Length of Lay of First and Second Element Wires

In the case of an example in which the first conductor includes the first element wires that are twisted together, a number of the first element wires at an outermost layer of the first conductor, that is, the number of the element wires, n, is counted.

Then, a linear scale is placed on the first conductor along a center axis of the first conductor, to measure a distance from a reference element wire to a (n+1)th element wire, and the measured length is regarded as the length of lay of a first element wire in the first conductor.

Although the first conductor is measured in this example, the length of lay of a second element wire in the second conductor is measured in a similar manner.

(2) Bending Resistance Test

For the multicore cables obtained in the following experiment examples, a bending resistance test was performed according to a method in conformance with JIS C 6851 (2006) (Optical Fiber Characteristics Test Method).

Figure 5:
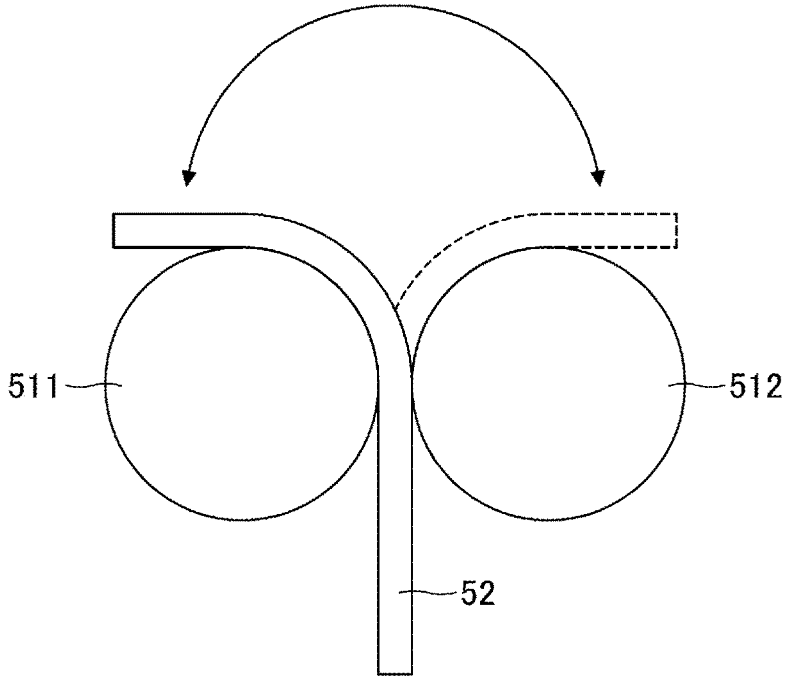
FIG. 5 is a diagram schematically illustrating a method of a bending resistance test in experiment examples.

More particularly, as illustrated in FIG. 5, a multicore cable 52 to be evaluated was disposed in a vertical direction and sandwiched between two mandrels 511 and 512 that have a diameter of 60 mm and are disposed horizontally and parallel to each other, and after bending an upper end by 90° in the horizontal direction so as to make contact with an upper end of one mandrel 511, the upper end is bend by 90° in the horizontal direction so as to make contact with an upper end of the other mandrel 512, and such a bending was repeated at −30° C. inside a temperature-controlled chamber. The bending was repeated while measuring the resistance value by connecting the two conductors in the cable, and the number bends made when the resistance increases to a value greater than or equal to 10 times an initial resistance value (the number of bends is counted as one when the bend is made to the right, and the bend is thereafter made to the left and then returns to the right) was regarded as an index value of the bending resistance test. The larger the index value of the bending resistance test, that is, the larger the number of bends is, the better the bend resistance is.

The evaluation is D when the index value is less than 3000 times, C when greater than or equal to 3000 times and less than 10000 times, B− when greater than or equal to 10000 times and less than 15000 times, B when greater than or equal to 15000 times and less than 30000 times, and A when greater than or equal to 30000 times. This means that A has the highest bending resistance, D has the lowest bending resistance, and the bending resistance decreases in the order of A, B, B−, C, and D. In the case of any one of A, B, or B−, the multicore cable can be evaluated as having a sufficient bending resistance.

(3) Shape Stability Test

A shape stability test was performed on the multicore cable obtained in the following experiment examples.

In the shape stability test, the diameters (outside diameters) in two perpendicular directions were first measured in a cross section perpendicular to the longitudinal direction of the multicore cables obtained in the following experiment examples.

Then, between the measured diameters in the two directions, a ratio of the longer diameter (major diameter) with respect to the shorter diameter (minor diameter), that is, the ratio of the “major diameter”/“minor diameter”×100, the evaluation is A when the ratio is greater than or equal to 100% and less than 105%, B when greater than or equal to 105% and less than 110%, C when greater than or equal to 110% and less than 115%, and D when greater than or equal to 115%. This means that A has the highest shape stability, D has the lowest shape stability, and the shape stability decreases in the order of A, B, C, and D.

(4) Productivity Evaluation

A production output (length) of the multicore cable per 1 hour was evaluated with reference to an experiment example 1, and the evaluation is C when less than 1.2 times, B when greater than or equal to 1.2 times and less than 1.35 times, B when greater than or equal to 1.35 and less than 1.5 times, A when greater than or equal to 1.5 times and less than 2.0 times, and A+ when greater than or equal to 2.0 times that of the experiment example 1. This means that A+ has the highest productivity, C has the lowest productivity, and productivity decreases in the order of A+, A, B, B−, and C.

EXPERIMENT EXAMPLES

Hereinafter, the experimental conditions will be described. The experiment example 1 through experiment example 7 are exemplary implementations, and an experiment example 8 is a comparative example.

Experiment Example 1

The multicore cable 10 illustrated in FIG. 1 was manufactured and evaluated. More particularly, the core 13 includes two power lines 11, and a twisted signal line pair 12 including two signal lines 121.

The power line 11 includes one first conductor 111 disposed at the center, and six second conductors 112 disposed around the outer periphery of the first conductor 111. In addition, the power line 11 includes the first insulating layer 113 covering the first conductor 111 and the second conductors 112.

The first conductor 111 is formed by 48 first element wires having an element wire diameter of 0.08 mm twisted in a right-laid configuration. The second conductor 112 is formed by 48 second element wires having an element wire diameter of 0.08 mm twisted in the right-laid configuration.

Both the first conductor 111 and the second conductor 112 had an outside diameter of 0.63 mm, and a cross sectional area of 0.24 $mm^2$. In the other experiment examples referred in the following, the outside diameter and cross sectional area of the first conductor 111 and the second conductor are the same. In addition, when the length of lay of the first element wires and the second element wires was measured, it was confirmed that the values are as illustrated in Table 1.

The power lines 11 includes the first conductor 111 and the second conductor 112 twisted in the right-laid configuration.

The twisted signal line pair 12 is formed by two signal wires 121, each including the three third conductors 1211, twisted in the right-laid configuration. In the signal line 121, the three third conductors 1211 are twisted in the right-laid configuration. The three third conductors 1211 are covered by the second insulating layer 1212. The third conductor 1211 is formed by 16 element wires that are twisted together, and the third conductor 1211 has an outside diameter of is 1.6 mm, and a cross sectional area of 0.25 $mm^2$.

The cross sectional areas of the signal lines 121 used are all smaller than the cross sectional area of the power line 11. The same applies to the other experiment examples referred in the following.

The core 13 is formed by twisting the two power lines 11 described above, and the twisted signal line pair 12 in the right-laid configuration along the longitudinal direction. A thin paper is disposed around the core 13, as the left-hand lay 15, and the outer jacket 14 is disposed to cover the core 13.

The outer jacket 14 includes the first sheath layer 141 and the second sheath layer 142. The first sheath layer 141 had a minimum thickness of 0.65 mm, and was formed of polyethylene resin. The second sheath layer 142 had an average thickness of 0.5 mm, and was formed of polyurethane resin.

The bending resistance test, the shape stability test, and the productivity evaluation were made on the obtained multicore cable. Evaluation results are illustrated in Table 1.

Experiment Example 2

When manufacturing the second conductor 112, the length of lay of the second element wires was changed, but otherwise, the multicore cable was manufactured and evaluated in the same manner as the experiment example 1. In addition, when the length of lay of the first element wires and the second element wires was measured, it was confirmed that the values are as illustrated in Table 1.

The Evaluation Results are Illustrated in Table 1.

Experiment Example 3

When manufacturing the first conductor 111 and the second conductor 112, the length of lay of the first element wires and the second element wires was changed, but otherwise, the multicore cable was manufactured and evaluated in the same manner as the experiment example 1. In addition, when the length of lay of the first element wires and the second element wires was measured, it was confirmed that the values are as illustrated in Table 1.

The evaluation results are illustrated in Table 1.

Experiment Example 4

When manufacturing the second conductor 112, the length of lay of the second element wires was changed, but otherwise, the multicore cable was manufactured and evaluated in the same manner as the experiment example 3. In addition, when the length of lay of the first element wires and the second element wires was measured, it was confirmed that the values are as illustrated in Table 1.

The evaluation results are illustrated in Table 1.

Experiment Example 5

When manufacturing the second conductor 112, the length of lay of the second element wires was changed, but otherwise, the multicore cable was manufactured and evaluated in the same manner as the experiment example 3. In addition, when the length of lay of the first element wires and the second element wires was measured, it was confirmed that the values are as illustrated in Table 1.

The evaluation results are illustrated in Table 1.

Experiment Example 6

When manufacturing the first conductor 111 and the second conductor 112, the length of lay of the first element wires and the second element wires was changed, but otherwise, the multicore cable was manufactured and evaluated in the same manner as the experiment example 1. In addition, when the length of lay of the first element wires and the second element wires was measured, it was confirmed that the values are as illustrated in Table 1.

Experiment Example 7

When manufacturing the first conductor 111 and the second conductor 112, the length of lay of the first element wires and the second element wires was changed, but otherwise, the multicore cable was manufactured and evaluated in the same manner as the experiment example 1. In addition, when the length of lay of the first element wires and the second element wires was measured, it was confirmed that the values are as illustrated in Table 1.

Experiment Example 8

When manufacturing the second conductor 112, the second element wire was twisted in a left-laid configuration, but otherwise, the multicore cable was manufactured and evaluated in the same manner as the experiment example 5. In addition, when the length of lay of the first element wires and the second element wires was measured, it was confirmed that the values are as illustrated in Table 1.

The evaluation results are illustrated in Table 1.

TABLE 1

| | | | Experiment Example 1 | Experiment Example 2 | Experiment Example 3 | Experiment Example 4 | Experiment Example 5 | Experiment Example 6 | Experiment Example 7 | Experiment Example 8 |
|---|---|---|---|---|---|---|---|---|---|---|
| Twisting Condition | First Conductor | Length of Lay (mm) of First Element Wire | 8 | 8 | 10 | 10 | 10 | 14 | 22 | 10 |
| | | Direction of Lay of First Element Wire | Right | Right | Right | Right | Right | Right | Right | Right |
| | Second Conductor | Length of Lay (mm) of Second Element Wire | 8 | 14 | 11 | 14 | 22 | 14 | 22 | 22 |
| | | Direction of Lay of Second Element Wire | Right | Right | Right | Right | Right | Right | Right | Left |
| | Direction of Lay of First Conductor & Second Conductor | | Right | Right | Right | Right | Right | Right | Right | Right |
| Evaluation Results | | Bending Resistance Test | B | A | A | A | A | B | B– | C |
| | | Shape Stability Test | A | A | A | A | B | B | B | B |
| | | Productivity Evaluation | C | B– | B | B | B | A | A+ | B |

According to the results illustrated in Table 1, in the multicore cables of the experiment examples 1 through 7 in which the direction of lay of the first element wires, the direction of lay of the second element wires, and the direction of lay of the first and second conductors are the same, the evaluation results of the bending resistance test were one of A, B, and B–, and it was confirmed that the cable has a sufficient bending resistance.

Especially in the experiment examples 2 through 5 in which the length of lay of the first element wires is shorter than the length of lay of the second element wires, the evaluation result of the bending resistance test was A, and it was confirmed that the cable has a particularly excellent bending resistance.

On the other hand, in the multicore cable of the experiment example 8 in which the direction of lay of the first element wires and the direction of lay of the second element wires are different, the evaluation result of the bending resistance test was C, and it was confirmed that the bending resistance is poor.

DESCRIPTION OF THE REFERENCE NUMERALS

10, 20, 30, 52 Multicore cable
11 Power line
111 First conductor
112 Second conductor
113 First insulating layer
12 Twisted signal line pair
121 Signal line
1211 Third conductor
1212 Second insulating layer
13, 23, 33 Core
14 Outer jacket
141 First sheath layer
142 Second sheath layer
15 Left-hand lay
16 Region
21 Electric wire
211 Fourth conductor
212 Third insulating layer
41 First element wire
42 Second element wire
511, 512 Mandrel

The invention claimed is:

1. A multicore cable comprising:

a plurality of power lines; and an outer jacket covering the plurality of power lines, wherein the power lines include one first conductor disposed at a center, and a plurality of second conductors disposed on an outer periphery of the first conductor, that are twisted together, the first conductor includes 10 or more and 100 or less twisted first element wires, the second conductor includes 10 or more and 100 or less twisted second element wires, a direction of lay of the first element wires of the first conductor, a direction of lay of the second element wires of the second conductor, and a direction of lay of the first conductor and the second conductors of the power line are the same, a length of lay of the first element wires and a length of lay of the second element wires are greater than or equal to 8 mm and less than or equal to 22 mm, and the length of lay of the second element wires is greater than or equal to 1.1 times the length of lay of the first element wires, and less than or equal to 1.4 times the length of lay of the first element wires.

2. The multicore cable as claimed in claim 1, wherein the length of lay of the first element wires is shorter than the length of lay of the second element wires.

3. The multicore cable as claimed in claim 1, wherein the length of lay of the first element wires and the length of lay of the second element wires are greater than or equal to 10 mm and less than or equal to 14 mm.

4. The multicore cable as claimed in claim 1, wherein the plurality of power lines are twisted together, and a direction of lay of the plurality of power lines is the same as the direction of lay of the first element wires of the first conductor, the direction of lay of the second element wires of the second conductor, and the direction of lay of the first conductor and the second conductors of the power line.

5. The multicore cable as claimed in claim 1, further comprising:

a twisted signal line pair including two twisted signal lines having a smaller cross sectional area than the power line, wherein the signal line includes a plurality of twisted third conductors, and a direction of lay of the third conductors of the signal line is the same as a direction of lay of the signal lines of the twisted signal line pair.

6. The multicore cable as claimed in claim 1, further comprising:

a twisted signal line pair including two twisted signal lines having a smaller cross sectional area than the power line, wherein the signal line includes a plurality of twisted third conductors, a direction of lay of the third conductors of the signal line is the same as a direction of lay of the signal lines of the twisted signal line pair, the twisted signal line pair and the plurality of power lines are twisted together, and a direction of lay of the twisted signal line pair and the plurality of power lines is the same as the direction of lay of the signal lines of the twisted signal line pair.

7. A multicore cable comprising:

a plurality of power lines; and an outer jacket covering the plurality of power lines, wherein the power lines include one first conductor disposed at a center, and a plurality of second conductors disposed on an outer periphery of and in contact with the first conductor, that are twisted together, the first conductor includes 10 or more and 100 or less twisted first element wires, the second conductor includes 10 or more and 100 or less twisted second element wires, a direction of lay of the first element wires of the first conductor, a direction of lay of the second element wires of the second conductor, and a direction of lay of the first conductor and the second conductors of the power line are the same, a length of lay of the first element wires and a length of lay of the second element wires are greater than or equal to 8 mm and less than or equal to 22 mm, and the length of lay of the first element wires is shorter than the length of lay of the second element wires.

8. The multicore cable as claimed in claim 7, wherein the length of lay of the second element wires is greater than or equal to 1.0 times the length of lay of the first element wires, and less than or equal to 2.2 times the length of lay of the first element wires.

9. The multicore cable as claimed in claim 7, wherein the length of lay of the first element wires is greater than or equal to 8 mm and less than or equal to 10 mm, and the length of lay of the second element wires is greater than or equal to 14 mm and less than or equal to 22 mm.

10. The multicore cable as claimed in claim 7, wherein the first conductor and the second conductor have a cross sectional area greater than or equal to 0.1 $mm^2$ and less than or equal to 0.5 $mm^2$.

11. The multicore cable as claimed in claim 7, further comprising:

a twisted signal line pair including two twisted signal lines having a smaller cross sectional area than the power line, wherein the signal line includes a plurality of twisted third conductors, and a direction of lay of the third conductors of the signal line is the same as a direction of lay of the signal lines of the twisted signal line pair.

12. The multicore cable as claimed in claim 11, wherein the third conductors have a cross sectional area greater than or equal to 0.13 $mm^2$ and less than or equal to 0.5 $mm^2$.

* * * * *